(12) United States Patent
Dannoux et al.

(10) Patent No.: US 9,446,977 B2
(45) Date of Patent: Sep. 20, 2016

(54) METHOD AND SYSTEM FOR MAKING A GLASS ARTICLE WITH UNIFORM MOLD TEMPERATURE

(71) Applicant: CORNING INCORPORATED, Corning, NY (US)

(72) Inventors: Thierry Luc Alain Dannoux, Avon (FR); Raymond Chihchung Hsiao, Milpitas, CA (US); Nikolaos Pantelis Kladias, Horseheads, NY (US); Rohit Rai, Painted Post, NY (US); John Richard Ridge, Hammondsport, NY (US); John Robert Saltzer, Jr., Beaver Dams, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 154 days.

(21) Appl. No.: 14/096,490

(22) Filed: Dec. 4, 2013

(65) Prior Publication Data

US 2014/0157828 A1 Jun. 12, 2014

Related U.S. Application Data

(60) Provisional application No. 61/735,274, filed on Dec. 10, 2012.

(51) Int. Cl.
| | | |
|---|---|---|
| *C03B 23/023* | (2006.01) | |
| *C03B 25/08* | (2006.01) | |
| *C03B 35/14* | (2006.01) | |
| *C03B 23/025* | (2006.01) | |
| *C03B 23/035* | (2006.01) | |

(52) U.S. Cl.
CPC ....... *C03B 23/0258* (2013.01); *C03B 23/0357* (2013.01); *C03B 25/08* (2013.01); *C03B 35/14* (2013.01)

(58) Field of Classification Search
CPC ............ C03B 23/025; C03B 23/0254; C03B 23/0258; C03B 23/0357; C03B 25/08; C03B 25/093; C03B 35/14; C03B 35/142; C03B 35/161; C03B 35/162; B65G 49/063; B65G 49/064
See application file for complete search history.

(56) References Cited

U.S. PATENT DOCUMENTS

| | | |
|---|---|---|
| 3,236,621 A | 2/1966 | Caswall, Jr. et al. |
| 7,548,000 B2 | 6/2009 | Urbahn et al. ............ 310/54 |

(Continued)

FOREIGN PATENT DOCUMENTS

| | | |
|---|---|---|
| DE | 198 13 910 | 9/1999 |
| EP | 1 236 692 | 9/2002 |

(Continued)

OTHER PUBLICATIONS

Young, G. L.; Mcdonald, K. A.; Effect of Radiation Sheild Angle on Temperature and Stress Profiles During Rapid Thermal Annealing; Department of Chemical Engineering, California University; IEEE Transactions on Semiconductor Manufacturing; Nov. 1990; vol. 3; No. 4; pp. 176-182.

(Continued)

*Primary Examiner* — Jason L Lazorcik
*Assistant Examiner* — Cynthia Szewcyk
(74) *Attorney, Agent, or Firm* — John T. Haran (57) ABSTRACT

A glass sheet is formed on a mold into a glass article having a three-dimensional shape. The mold, with the glass article thereon, is arranged within an interior space of a radiation shield such that the mold is between a leading end barrier and a trailing end barrier of the radiation shield. The mold, glass article, and radiation shield are translated through a sequence of cooling stations while maintaining the mold between the leading and trailing end barriers, wherein the leading and trailing end barriers inhibit radiation heat transfer at leading and trailing ends of the mold.

14 Claims, 6 Drawing Sheets

(56) References Cited

U.S. PATENT DOCUMENTS

| | | | |
|---|---|---|---|
| 2002/0116953 A1* | 8/2002 | Yli-Vakkuri | C03B 23/0258 65/273 |
| 2010/0200594 A1 | 8/2010 | Husband et al. | 220/560.13 |
| 2011/0250366 A1 | 10/2011 | Pazzaglia et al. | 427/551 |
| 2011/0265515 A1* | 11/2011 | Hernandez Delsol | C03B 23/0258 65/29.18 |

FOREIGN PATENT DOCUMENTS

| | | |
|---|---|---|
| EP | 1 371 616 | 12/2003 |
| EP | 1 967 498 | 9/2008 |
| EP | 2 447 226 | 5/2012 |

OTHER PUBLICATIONS

Tsukada, T.; Hozawa, M.; Effect of a Radiation Shield on Thermal Stress Field During Czochralski Crystal Growth of Silicon; Journal of Chemical Engineering of Japan; Apr. 1990; vol. 23; No. 2; pp. 186-191.

Timans, P. J.; Morishige, R. N.; Wasserman, Y.; Emissivity-Independent Rapid Thermal Processing Using Radiation Shields; Materials Research Society Symposium Proceedings; 1997; vol. 470; pp. 57-62.

Patent Cooperation Treaty International Notification of Transmittal of the International Search Report and The Written Opinion of the International Searching Authority, international application number PCT/US2013/073777; mailing date Apr. 2, 2014, 11 pages.

* cited by examiner

METHOD AND SYSTEM FOR MAKING A GLASS ARTICLE WITH UNIFORM MOLD TEMPERATURE

CROSS-REFERENCE TO RELATED APPLICATIONS

This application claims the benefit of priority under 35 U.S.C. §119 of U.S. Provisional Application Ser. No. 61/735,274, filed on Dec. 10, 2012, the content of which is relied upon and incorporated herein by reference in its entirety.

FIELD

The present disclosure relates to a method and system for thermally reforming glass.

BACKGROUND

Glass articles, such as cover glasses, for handheld electronic devices may be made by thermal reforming, which involves heating a glass sheet to a temperature at which the glass can be deformed without damage and then forming the heated glass sheet into a glass article having a three-dimensional ("3D") shape.

SUMMARY

The present disclosure describes a method of making glass articles. In one aspect, the method includes forming a glass sheet on a mold into a glass article having a three-dimensional shape. The method further includes arranging the mold, with the glass article on the mold, within an interior space of a radiation shield such that the mold is between a leading end barrier and a trailing end barrier of the radiation shield. The mold, glass article, and radiation shield are translated through a sequence of cooling stations while maintaining the mold between the leading and trailing end barriers, wherein the leading and trailing end barriers inhibit radiation heat transfer at leading and trailing ends of the mold.

In at least one embodiment of the method, the arranging of the mold is such that the radiation shield extends by a height greater than zero above a top end of the mold.

In at least one embodiment of the method, the arranging of the mold is such that the radiation shield extends by a height greater than zero below a bottom end of the mold.

In at least one embodiment of the method, the arranging of the mold is such that there is an air gap between an outer circumferential edge of the mold and an inner surface of the radiation shield facing the interior space.

In at least one embodiment of the method, the forming of the glass article includes using vacuum to pull the glass sheet against a surface of the mold having a three-dimensional surface profile that defines the three-dimensional shape of the glass article.

In at least one embodiment, the method further includes maintaining temperatures in the cooling stations during the translation such that by the time the glass article reaches an end of the last cooling station in the sequence of cooling stations, the temperature of the glass article would have dropped to a temperature at which the viscosity of the glass article is greater than $10^{13}$ poise.

In at least one embodiment of the method, the leading and trailing end barriers inhibit heat transfer such that a maximum temperature differential across a surface of the mold adjacent to the glass article is less than 5° C.

In at least one embodiment of the method, the leading and trailing end barriers inhibit heat transfer such that a maximum temperature differential across a surface of the mold adjacent to the glass article is less than 2° C.

The present disclosure further describes an apparatus for making glass articles. In one aspect, the apparatus includes a mold having a mold surface for forming a glass sheet into a glass article having a three-dimensional shape. The apparatus further includes a radiation shield comprising a leading end barrier and a trailing end barrier arranged in opposing, spaced-apart relation to define an interior space in which the mold is received.

In at least one embodiment, the apparatus further includes a sequence of cooling stations arranged in order of decreasing temperature.

In at least one embodiment, the apparatus further includes a conveyor system for translating the radiation shield and mold along the sequence of cooling stations such that the mold remains within the interior space during the translation.

In at least one embodiment of the apparatus, at least a portion of the radiation shield forming the leading and trailing end barriers is coated with a material having an emissivity in a range from 0.1 to 0.4.

In at least one embodiment of the apparatus, the radiation shield is made of a material resistant to oxidation in a temperature range of 500° C. to 900° C.

In at least one embodiment of the apparatus, a reflective material is applied on at least a portion of the radiation shield forming the leading and trailing end barriers.

In at least one embodiment of the apparatus, the radiation shield extends by a height greater than zero above a top surface of the mold.

In at least one embodiment of the apparatus, the radiation shield extends by a height greater than zero below a bottom surface of the mold.

In at least one embodiment of the apparatus, the interior space is sized such that there is an air gap between the outer circumferential edge of the mold and an inner surface of the radiation shield facing the interior space.

In at least one embodiment of the apparatus, at least a portion of the radiation shield is configured as a cooling plate.

In at least one embodiment of the apparatus, at least a portion of the radiation shield includes an isothermal heat transfer device.

In at least one embodiment of the apparatus, the radiation shield has a structure selected from a pair of parallel walls, a box, a tube, and a dome.

It is to be understood that both the foregoing summary and the following detailed description are exemplary of the invention of the present disclosure and are intended to provide an overview or framework for understanding the nature and character of the invention as claimed. The accompanying drawings are included to provide a further understanding of the invention and are incorporated in and constitute a part of this disclosure. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

To meet design specifications, glass articles for handheld devices have to meet very tight shape accuracy on the order of ±50 μm. To achieve such shape accuracy, the glass article, after forming, is cooled and/or annealed while on the mold until the glass reaches a temperature below the glass transition temperature at which the glass article can be safely removed from the mold. The cooling phase typically involves transporting the mold, with the glass article thereon, along a succession of cooling stations. To prevent warping of the glass article and to achieve the required shape accuracy, the temperature differentials across the surface of the glass article should be very small, e.g., not greater than 5° C., and the temperature differentials across the thickness of the glass article should be very small, e.g., not greater than 2° C., during the cooling phase.

Temperature decreases progressively along the succession of cooling stations, which means that any downstream cooling station will have a lower temperature than the adjacent upstream cooling station. If there are no physical barriers between the cooling stations or the cooling stations are not physically separated, the leading end of the mold would be exposed to a lower temperature environment while the trailing end of the mold would be exposed to a higher temperature environment. This would induce a temperature differential between the leading and trailing ends of the mold. The induced temperature differential will influence the surface and thickness temperature differentials of the glass article on the mold, possibly resulting in unacceptable surface and thickness temperature differentials.

In the invention of the present disclosure, radiation barriers are formed at the leading and trailing ends of a mold while cooling a glass article on the mold. Modeling results show that temperature differential across the glass article of less than 2° C. can be achieved using this method and without a need for actively managing the temperature differential across the mold. This method eliminates the need to physically separate the cooling stations with insulation material that could potentially give rise to glass contamination. This method also minimizes warping of the glass article, making it possible to produce the glass article with shape accuracy that meets required specifications.

Figure 1:
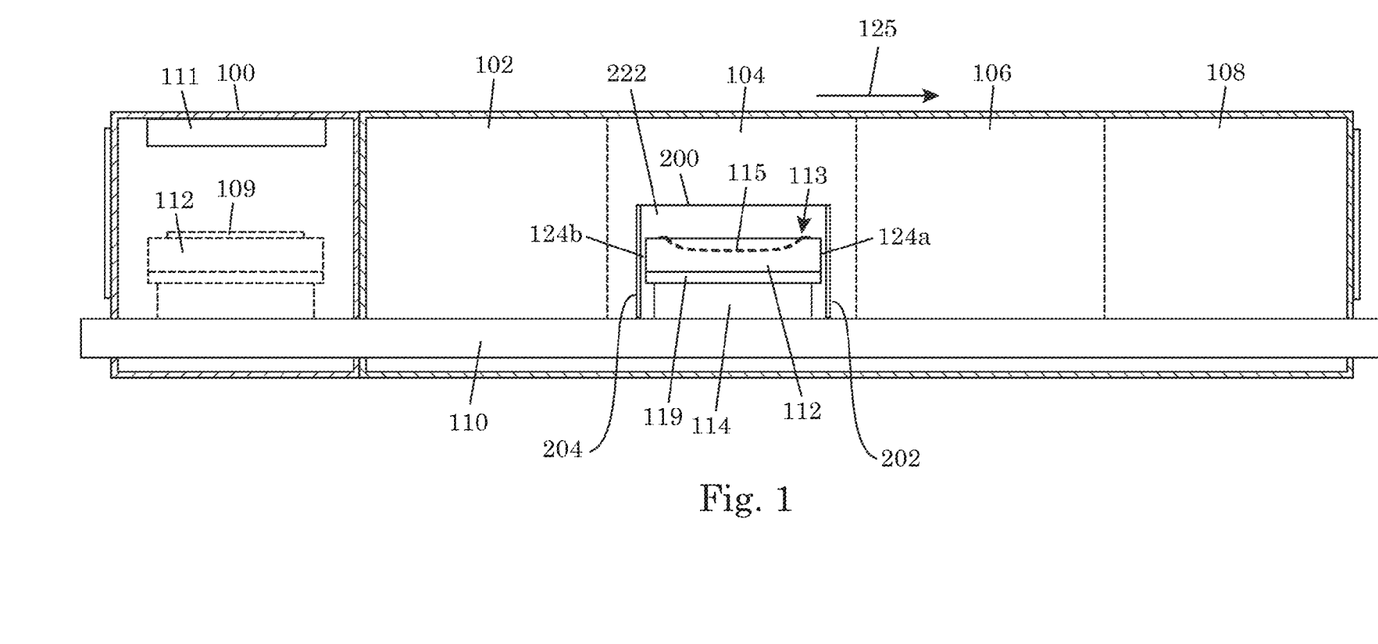
FIG. 1 shows a sequence of stations used in making a glass article.

FIG. 1 shows stations 100-108 in which a glass article having a 3D shape can be made. The first station 100 is a forming station where a glass sheet 109 will be formed into the glass article having a 3D shape using a mold 112. The forming station 100 is equipped with heating means 111, e.g., infrared heaters, resistive heaters, or induction heaters, for heating the glass sheet to a temperature at which it can be formed into the glass article. The remaining stations 102, 104, 106, 108 are cooling stations where the glass article will be cooled down to a temperature at which it can be safely separated from the mold 112. The cooling stations 102, 104, 106, 108 are each controlled to a different temperature, with the temperature of the cooling stations decreasing progressively from the first cooling station 102 closest to the forming station 100 to the last cooling station 108. That is, T(102)>T(104)>T(106)>T(108), where T is temperature. The cooling stations 102, 104, 106, 108 may incorporate heating elements and/or insulation (not identified separately) to provide a desired thermal environment in the cooling station. In some embodiments, there are no physical or insulating partitions between the cooling stations 102, 104, 106, 108. However, if there are physical partitions between the cooling stations 102, 104, 106, 108 in other embodiments, these partitions may be in the form of doors that can be selectively opened to allow passage of the mold 112 and glass on the mold from one station to another.

Extending through the stations 100-108 is a running table (or conveyor) 110, which may be a linear table (or conveyor) or a rotary table (or conveyor), which means that the stations 100-108 are not restricted to the linear arrangement of FIG. 1. As shown in FIG. 1, the mold 112 is in the second cooling station 104, having been translated from the forming station 100 into the first cooling station 102 and from the first cooling station 102 into the second cooling station 104. The mold 112 is supported on a mold support 114, which is supported on or otherwise coupled to the running table 110. The mold support 114 may incorporate rotating means so that the mold 112 is rotatable while in or traveling through the cooling stations 102-108. The mold 112 is carrying a glass article 115, which was formed from the glass sheet 109 in the forming station 100. The mold 112 and glass article 115 may be referred to as glass/mold assembly 113.

Surrounding at least the leading and trailing ends 124a, 124b of the mold 112 is a radiation shield 200. With the radiation shield 200 surrounding the mold 112, the radiation shield 200 and glass/mold assembly 113 are translated through the sequence of cooling stations 102-108 together. The radiation shield 200 may be supported on or otherwise coupled to the running table 110 so as to travel with the glass/mold assembly 113 through the cooling stations 102-108. Alternatively, the radiation shield 200 may be provided with a separate running table (or conveyor), with the operation of the running table of the radiation shield 200 coordinated with that of the mold 112 so that the relationship between the radiation shield 200 and mold 112 is preserved through translating the radiation shield 200 and glass/mold assembly 113 through the sequence of cooling stations 102-108. The radiation shield 200 may be disposed around the mold 112 after the mold 112 has been translated from the forming station 100 into the first cooling station 102. Alternatively, the radiation shield 200 may be disposed around the mold 112 before the mold 112 and glass sheet 109 are loaded into the forming station 100, in which case the radiation shield 200 will also surround the mold 112 while the mold 112 is in the forming station 110.

The radiation shield 200 comprises a front surface 202 and a back surface 204, which are in opposing relation, and an interior space 222, which is large enough to accommodate the mold 112, defined between the surfaces 202, 204. When the mold 112 is arranged in the interior space 222, the front surface 202 is adjacent to the leading end 124a of the mold 112 and forms a barrier between the leading end 124a and the radiation view factor to the cooling station downstream of the leading end 124a. Hence, the front surface 202 may be referred to as a leading end barrier. Also, when the mold 112 is arranged in the interior space 222, the back surface 204 is adjacent to the trailing end 124b of the mold 112 and forms a barrier between the trailing end 124b and the radiation view factor to the cooling station upstream of the trailing end 124b. Hence, the back surface 204 may be referred to as a trailing end barrier. It should be noted that the parts of the mold 112 corresponding to the leading and trailing ends 124a, 124b may not be fixed, e.g., if the mold 112 is being rotated while arranged within the interior space 222. Therefore, what is regarded as the leading end 124a of the mold 112 at any instance will be whatever end of the mold 112 is facing the direction in which the mold 112 is traveling. Similarly, what is regarded as the trailing end 124b of the mold 112 at any instance will be whatever end of the mold 112 is facing a direction opposite to the direction in which the mold 112 is traveling.

Figure 2A:
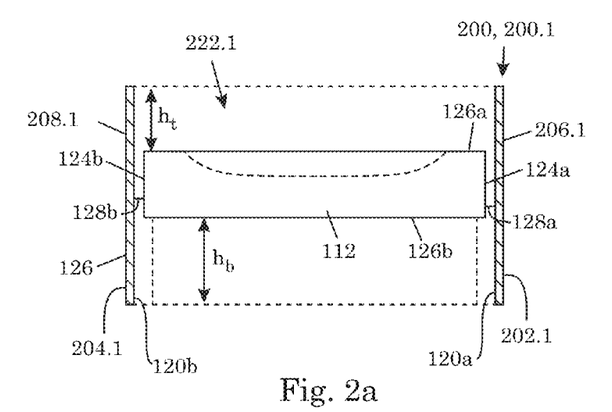
FIG. 2a is a cross-sectional view of a radiation shield with a mold arranged in an interior space of the radiation shield.

FIG. 2a shows radiation shield 200.1, an embodiment of the radiation shield 200, in form of two parallel walls. The radiation shield 200.1 has opposing front and back walls 206.1, 208.1. The surfaces 202.1, 204.1 of the front and back walls 206.1, 208.1 provide the barrier-forming front and back surfaces mentioned above. The front and back walls 206.1, 208.1 are spaced apart to define an interior space 222.1 within which the mold 112 is received. The dimensions of the front and back walls 206.1, 208.1 may be selected such that in use the radiation shield 200.1 extends by a height $h_t>0$ above the top end 126a of the mold 112 and/or by a height $h_b>0$ below the bottom end 126b of the mold 112. The spacing between the front and back walls 206.1, 208.1 may be selected such that air gaps 128a, 128b exist between the front and back walls 206.1, 208.1 (or inner surfaces 120a, 120b facing the interior space 222.1) and the leading and trailing ends 124a, 124b of the mold 112. The air gaps 128a, 128b may or may not have the same width. The front and back walls 206.1, 208.1 are shown as flat and vertical in FIG. 2a, but in alternate embodiments, they could be curved and/or slanted.

Figures 2B, 2C:
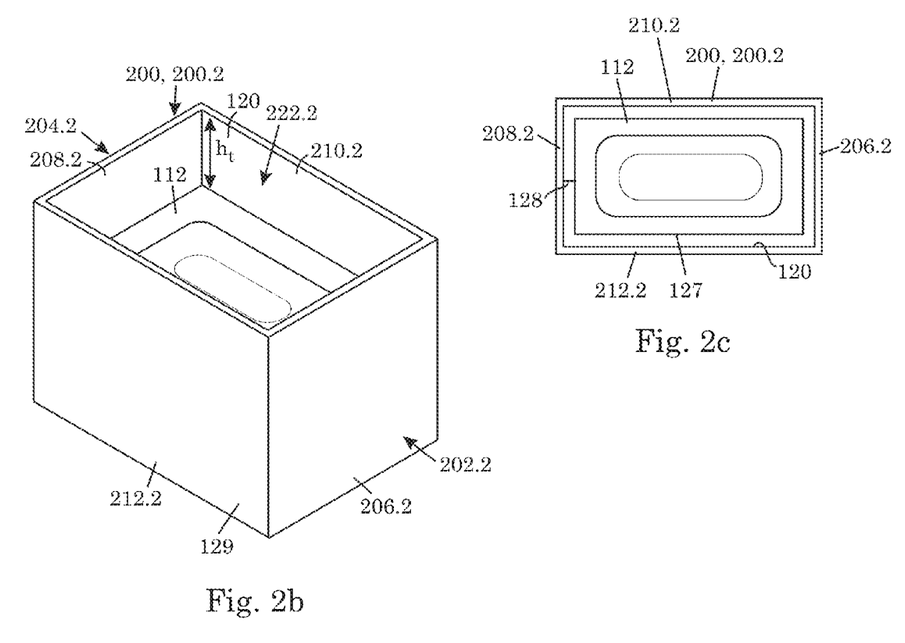
FIG. 2b is a perspective view of a radiation shield with a mold arranged in an interior space of the radiation shield.
FIG. 2c is a top view of the radiation shield and mold of FIG. 2b.

FIG. 2b shows radiation shield 200.2, which is one embodiment of the radiation shield 200, in form of a box. The radiation shield 200.2 has opposing front and back walls 206.2, 208.2 and opposing side walls 210.2, 212.2. The surfaces 202.2, 204.2 of the front and back walls 206.2, 208.2 provide the barrier-forming front and back surfaces mentioned above. The front and back walls 206.2, 208.2 are spaced apart to define an interior space 222.2 within which the mold 112 is received. The side walls 210.2, 212.2 extend between and adjoin the ends of the front and back walls 206.2, 208.2, thereby enclosing the sides of the interior space 222.2. As in the case of the radiation shield 200.1, the dimensions of the walls 206.2, 208.2, 210.2, 212.2 can be selected such that in use the radiation shield 200.2 extends by a height $h_t>0$ above the top end of the mold and/or by a height $h_b>0$ below the top end of the mold. Also, as shown in FIG. 2c, the spacing between the front and back walls 206.2, 208.2 and between the side walls 210.2, 212.2 may be selected such that an air gap 128 exists between the circumferential edge 127 of the mold 112 and the inner surface 120 of the radiation shield 200.2 facing the interior space 222.2. The air gap 128 may or may not have a uniform width around the mold 112.

Figure 2D:
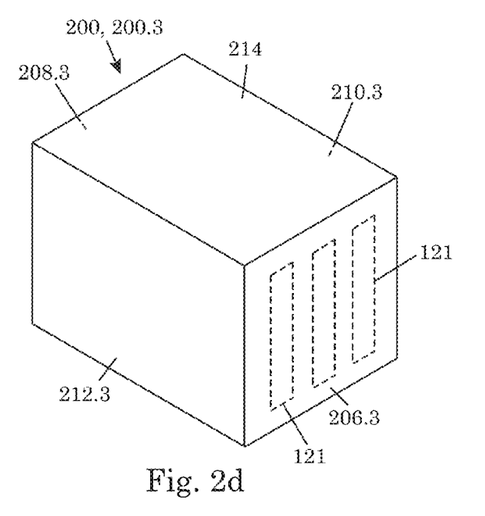
FIG. 2d is a perspective view of a radiation shield with a top cover.

FIG. 2d shows radiation shield 200.3 in box form, with front and back walls 206.3, 208.3 and side walls 210.3, 212.3. A top cover wall 214 is secured to or integrally formed with the top of the walls 206.3, 208.3, 210.3, 212.3. In alternate embodiments, a bottom cover wall (not shown) may be secured to or integrally formed with the bottom of the walls 206.3, 208.3, 210.3, 212.3. Thus, the radiation shield 200.3 may have a top and/or bottom cover wall. Where the radiation shield 200.3 has both top and bottom covers, a door should be provided in at least one of the walls 206.3, 208.3, 210.3, 212.3 and cover walls to allow the mold 112 to be arranged in the interior space of the radiation shield. Except for the top cover wall 214, the radiation shield 200.3 has a structure similar to that of radiation shield 200.2 (in FIG. 2b).

Figure 2E:
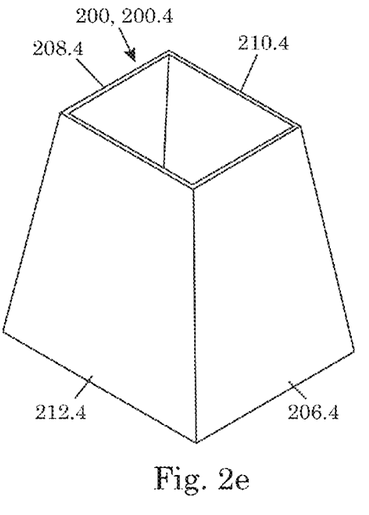
FIG. 2e is a perspective view of a radiation shield with slanted walls.

FIG. 2e shows another radiation shield 200.4 that has a structure that is similar to that of radiation shield 200.2 (in FIG. 2b). The main difference between the radiation shields 200.4, 200.2 is that the front and back walls 206.4, 208.4 and side walls 210.4, 212.4 of the radiation shield 200.4 are slanted. In alternate embodiments, the radiation shield 200.4 may also be provided with a top and/or bottom cover wall as described with respect to radiation shield 200.3 (in FIG. 2d).

Figure 2F:
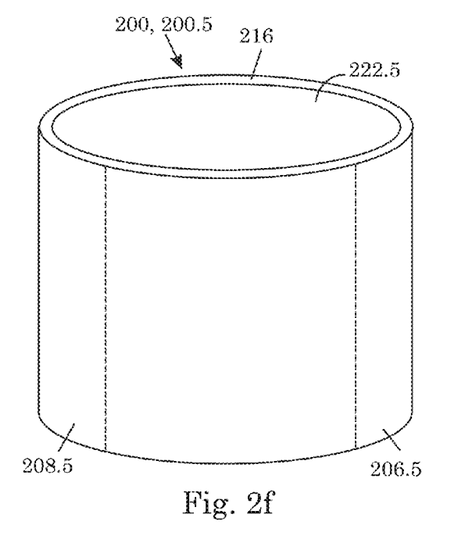
FIG. 2f is a perspective view of a tubular radiation shield.

FIG. 2f shows a radiation shield 200.5 having a curved wall 216 in tubular form. The mold will be arranged in the interior space 222.5 formed by the curved wall 216. The cross-sectional shape of the tube formed by the curved wall 216 may be circular, oval, or even an irregular closed shape. In use, the front and back wall sections 206.5, 208.5 of the curved wall 216 will provide the leading and trailing end barriers. If desired, the radiation shield 200.5 may be provided with top and/or bottom cover walls, as described with respect to radiation shield 200.3 (in FIG. 2d).

Figure 2G:
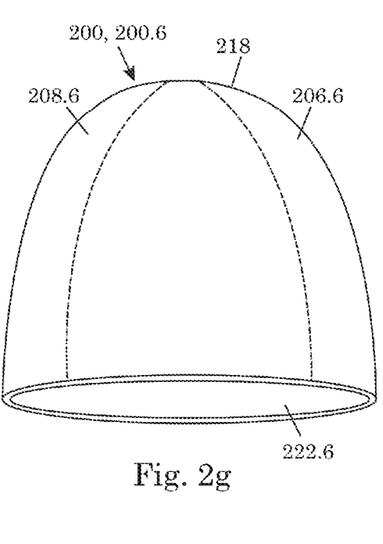
FIG. 2g is a perspective view of a dome-shaped radiation shield.

FIG. 2g shows radiation shield 200.6 having a curved wall 218 in dome or paraboloid form. The mold will be arranged in the interior space 222.6 of the dome. In use, the front and back wall sections 206.6, 208.6 of the curved wall or dome 218 will provide the leading and trailing end barriers of the radiation shield. If desired, the radiation shield 200.6 may be provided with a bottom cover wall, as described with respect to radiation shield 200.3 (in FIG. 2d).

In some embodiments, any of the radiation shields described above may incorporate one or more isothermal heat transfer devices, such as heat pipes, in their walls. For illustration purposes, FIG. 2d shows heat pipes 121 in the front wall 206.3. This does not necessarily mean that isothermal heat transfer device(s) have to be located in front walls. The location of the isothermal heat transfer devices would be selected based on the desired temperature distribution within the interior space of the radiation shield.

Alternatively, any of the walls of the radiation shields described above may be cooling plates.

In some embodiments, any of the walls of the radiation shields described above may have holes or openings or doors, which may be strategically positioned for various uses such as venting the interior space of the radiation shield, measuring conditions within the interior space of the radiation shield, performing operations within the interior space of the radiation shield, and supplying fluid, such as a cooling fluid, to the radiation shield, e.g., where the radiation shield incorporates isothermal heat transfer devices or cooling plates.

Returning to FIG. 1, the radiation shield 200 achieves mold/glass article temperature uniformity by blocking thermal radiation view factors to upstream and downstream cooling stations at the leading and trailing ends 124a, 124b of the mold 112. Further improvements to the mold/glass article temperature uniformity can be realized when the walls or wall sections of the radiation shield 200 are coated with a material of low emissivity. The coating may be applied to the entire radiation shield 200 or limited to the walls or wall sections providing the front and back surfaces 202, 204 that serve as the leading and trailing end barriers. In some embodiments, the low-emissivity coating material has an emissivity in a range from 0.1 (e.g., platinum) to 0.4 (e.g., gold).

In some embodiments, the wall(s) of the radiation shield 200 is made of a material that is resistant to oxidation at the high temperatures that would be encountered in the cooling stations, such as temperatures in a range from 500° C. to 900° C. For example, the wall(s) of the radiation shield 200 may be made of a superalloy, such as INCONEL® 600 alloy (which is a nickel-chromium alloy). Other materials that do not oxidize at temperatures as high as 900° C. may alternately be used for the wall(s) of the radiation shield 200.

The ability of the radiation shield 200 to achieve mold/glass article temperature uniformity can be enhanced by applying a reflective material to the inner surface (e.g., 120 in FIG. 2b) and/or outer surface (e.g., 129 in FIG. 2b) of the radiation shield. In one example, the wall(s) of the radiation shield 200 is made of INCONEL® 600 alloy, and gold is deposited on the wall(s) by first spraying the wall(s) with a suspension of silicon carbide powder in epoxy resin, followed by vacuum deposition of gold. In another example, the wall(s) of the radiation shield 200 is made of INCONEL® 600 alloy, and Jade mirrors from colloidal solution or thin, e.g., 0.5 μm thick, foil are applied to the wall. Other combinations of materials besides those specifically mentioned above may alternately be used for the wall(s) of the radiation shield 200.

Depending on the mold/glass article dimensions, cooling station dimensions, and mold placement in the cooling stations, the values of $h_t$, $h_b$, and d, and $\epsilon$ can be selected to achieve a particular level of temperature uniformity across the top surface of the mold 112. The parameter $h_t$ is the height by which the radiation shield 200 extends above the top end of the mold 112 (see, e.g., $h_t$ in FIG. 2a). The parameter $h_b$ is the height by which the radiation shield 200 extends below the bottom end of the mold 112 (see, e.g., $h_b$ in FIG. 2a). The parameter d is the smallest width of the air gap between the inner surface of radiation shield 200 facing the interior space of the radiation shield 200 and the outer circumferential edge of the mold 112 (see, e.g., air gaps 128a, 128b in FIG. 2a or air gap 128 in FIG. 2c). The parameter c is the emissivity of the radiation shield 200, especially the emissivity of the portion of the radiation shield 200 providing the leading and trailing end barriers. In one or more embodiments, each of $h_t$, $h_b$, and d is greater than zero. In general, the optimal values of $h_t$, $h_b$, and d will depend on the dimensions of the cooling stations (102-108 in FIG. 1), dimensions of mold 112, and placement of mold 112 in the cooling stations.

Figure 3:
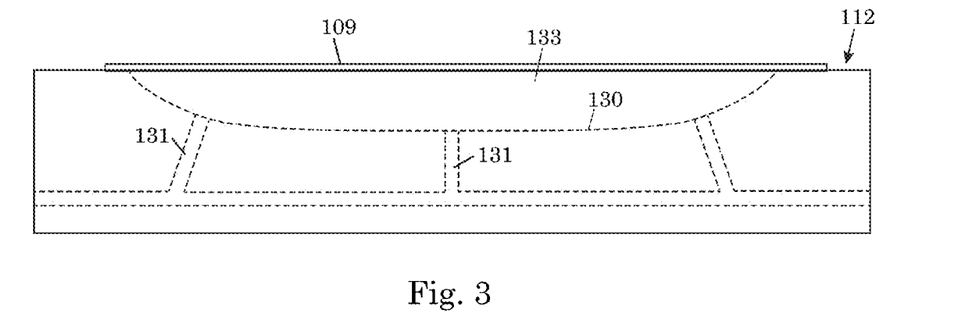
FIG. 3 shows a mold for forming a glass sheet into a glass article.

In FIG. 3, the mold 112 has a mold surface 130, whose 3D surface profile will determine the shape of the glass article 115 (in FIG. 1). To allow forming by vacuum, holes 131 may be formed in the mold 112. Through the holes 131, vacuum can be applied to the cavity 133 above the mold surface 130 in order to pull the glass sheet 109 into the cavity 133 and against the mold surface 130. The mold 112 is made of a material that can withstand high temperatures such as would be encountered in the stations 100-108. The mold material may be one that will not react with (or stick to) the glass 109 under forming conditions, or the mold surface 130 may be coated with a coating material that will not react with (or stick to) the glass 109 under the forming conditions. In one example, the mold is made of a non-reactive carbon material, such as graphite, and the mold surface 130 is highly polished to avoid introducing defects into the glass when the mold surface is in contact with the glass. In another example, the mold is made of a dense ceramic material, such as silicon carbide, tungsten carbide, or silicon nitride, and the mold surface 130 is coated with a non-reactive carbon material, such as graphite. In another example, the mold 130 is made of a superalloy, such as INCONEL® 718 alloy, a nickel-chromium alloy, and the molding surface 130 is coated with a hard ceramic material, such as titanium aluminum nitride. The atmosphere in the forming station 100 should be inert if the mold 112 is made of a carbon material or if the mold surface 130 is coated with a carbon material.

The composition of the glass sheet 109, which will be formed into the glass article 115 (in FIG. 1) is selected based on the desired properties of the glass article. For applications requiring high strength and scratch-resistance, the glass sheet may be made of an ion-exchangeable glass, i.e., a glass containing relatively small alkali metal or alkaline-earth metal ions that can be exchanged for relatively large alkali or alkaline-earth metal ions. Examples of ion-exchangeable glasses can be found in the patent literature, e.g., U.S. Pat. No. 7,666,511 (Ellison et al; 20 Nov. 2008), U.S. Pat. No. 4,483,700 (Forker, Jr. et al.; 20 Nov. 1984), and U.S. Pat. No. 5,674,790 (Araujo; 7 Oct. 1997), all incorporated by reference in their entireties, and are also available from Corning Incorporated under the trade name GORILLA® glass. Typically, these ion-exchangeable glasses are alkali-aluminosilicate glasses or alkali-aluminoborosilicate glasses. The ion-exchangeable glass will allow chemical tempering of the glass article by ion-exchange, which would improve both the strength and scratch resistance of the glass article.

To form the glass article 115, the glass sheet 109 is placed on the mold 112, as shown in FIG. 3. Then, the glass sheet 109 and mold 112 are loaded into the forming station 100, as shown in FIG. 1. Prior to loading the glass sheet 109 and mold 112 into the forming station 100, the glass sheet 112 is preheated to some initial temperature, i.e., in order to minimize the residence time of the glass/mold assembly in the forming station 100. This initial temperature will be below a forming temperature at which the glass can be deformed. At the forming station 100, the glass sheet 109 is heated to the forming temperature at which the glass can be formed into the glass article. Typically, the forming temperature will be between a temperature corresponding to a glass viscosity of $10^{13}$ poise and a temperature corresponding to a glass viscosity of $10^7$ poise. Preferably, the forming temperature will be between a temperature corresponding to a glass viscosity of $10^{11}$ poise and a temperature corresponding to glass viscosity of $10^7$ poise. More preferably, the forming temperature will be between a temperature corresponding to a glass viscosity of $10^{9.1}$ poise and a temperature corresponding to a glass viscosity of $10^{7.7}$ poise. The glass article 115 is formed by allowing the glass sheet 109 to slump against the mold surface 130 (in FIG. 3) and/or by using vacuum to pull the glass sheet 109 against the mold surface 130. Depending on the forming technique, the glass article 115 can be formed in 5 to 45 seconds. Depending on the cooling method (active versus passive), cooling of the glass article 115 on the mold 112 can take 2 to 10 minutes.

The combination of the glass article 115 and mold 112 may be referred to as glass/mold assembly 113. After the glass article 115 is formed, the glass/mold assembly 113 is transported from the forming station 100 to the first cooling station 102. The radiation shield 200 is arranged to surround the mold 112 either before the glass/mold assembly 113 enters the first cooling station 102 or as soon as the glass/mold assembly 113 enters the first cooling station 102. Within the first cooling station 102, the temperature of the glass article 115 is allowed to drop by some predetermined amount. The glass/mold assembly 113 may include a cooling plate 119 below the mold 112. A coolant, such as cooled air, can be circulated through the cooling plate 119 to reduce the temperature of the mold 112. The air temperature in the cooling station will attempt to reach equilibrium with the mold temperature, and the temperature of the glass article will be between the air temperature and mold temperature.

Then, the glass/mold assembly 113 is moved into the second cooling station 104, where the temperature of the glass article is again allowed to drop by some predetermined amount. Again, cooling of the glass article 115 may be assisted by operation of the cooling plate 119. This moving of the glass/mold assembly 113 from one station to the next continues until the glass/mold assembly 113 is in the last cooling station 108. At the end of the last cooling station 108, the glass article 115 will have a freezing temperature, which is a temperature at which the glass article 115 can be separated from the mold 112. In one embodiment, the freezing temperature is below a temperature corresponding to a glass viscosity of $10^{12}$ poise. Preferably, the freezing temperature is below a temperature corresponding to a glass viscosity of $10^{13}$ poise.

While the glass/mold assembly 113 is moving through the sequence of cooling stations 102-108 in the direction indicated by the arrow 125, the radiation shield 200 travels with the glass/mold assembly 113 and blocks radiation view factors from the leading and trailing ends 124*a*, 124*b* of the mold 112. That is, the leading end 124*a* of the mold 112 will be shielded from direct exposure to the thermal environment in the downstream cooling station, and the trailing end 124*b* of the mold 112 will be shielded from direct exposure to the thermal environment in the upstream cooling station or forming station. By blocking the radiation view factors, the radiation shield 200 inhibits radiation heat transfer at the leading and trailing ends 124*a*, 124*b* of the mold 112 that would have otherwise occurred due to exposure to the upstream and downstream stations. This means that the leading and trailing ends 124*a*, 124*b* of the mold 112 will see substantially the same temperature conditions as the remainder of the mold 112, which ultimately leads to a more uniform temperature distribution across the mold 112, which leads to reduced temperature differential across the glass article 115 carried by the mold 112. Additionally, the mold 112 may be rotated within the interior space of the radiation shield 200 to further improve temperature uniformity in the mold 112 and glass article 115.

Maximum temperature differential across the glass article of less than 5° C. can be achieved by cooling the glass article 115 with the radiation shield 200 blocking radiation view factors from the leading and trailing ends of the mold 112. When the radiation shield walls are coated with reflective material and their dimensions are optimized to the dimensions of the cooling stations and placement of the mold in the cooling stations, maximum temperature differential across the glass article of less than 2° C. can be achieved.

After the glass/mold assembly 113 is unloaded from the last cooling station 108, the glass article 115 is separated from the mold 112. The glass article 115 may then be subjected to various post-forming processes. For example, the edges of the glass article 115 could be trimmed to size, e.g., if the glass sheet used in forming the glass article did not have a net size prior to the forming of the glass article. The trimmed edges of the glass article 115 could be ground and polished. After this, the glass article 115 could be strengthened by chemical tempering, e.g., ion-exchange, or thermal tempering. Coatings such as anti-smudge coating or optical coatings may be applied on the surface of the glass article after strengthening. The glass article may also be annealed. However, it has been found that post-annealing may be bypassed due to the high mold temperature uniformity achievable using the radiation shield.

EXAMPLES

Example 1

Figure 4:
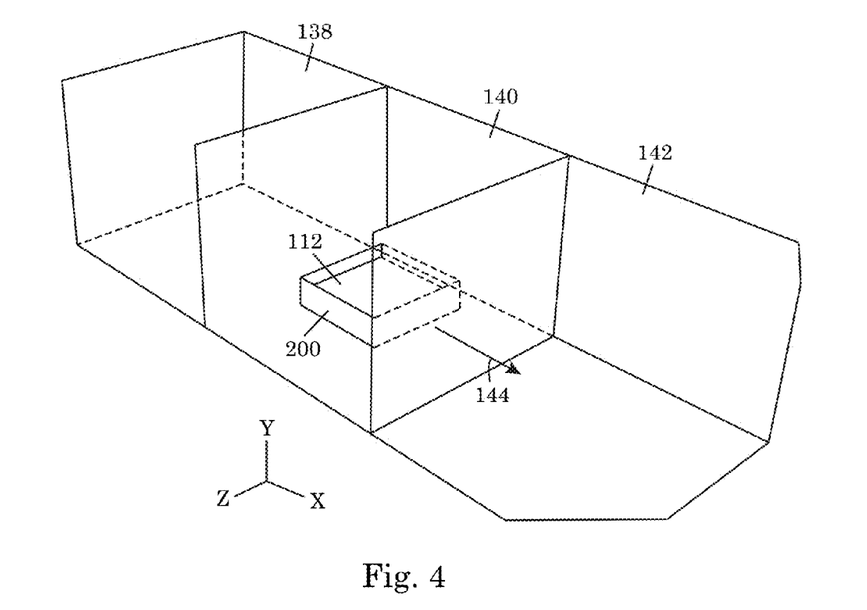
FIG. 4 shows a model used in investigating effectiveness of radiation shield on mold temperature uniformity.

A study was carried out to investigate the effectiveness of the radiation shield on mold temperature uniformity. For the study, a thermal model of the cooling process was developed and numerical simulations were performed using FLUENT® software by Ansys, Inc. FIG. 4 shows a schematic of the model used in the study, with the mold 112 and radiation shield 200 translated through a sequence of cooling stations 138-142 in the direction indicated by the arrow 144. For the study, the temperatures of the cooling stations 138, 140, 142 were controlled to 700° C., 660° C., and 620° C., respectively. The dimension of each of the cooling stations was 20 inches by 20 inches by 16 inches, with 16 inches being the height of the cooling station. The dimension of the mold was 8.5 inches by 8.5 inches by 0.5 inches, with 0.5 inches being the height of the mold.

Figure 5A:
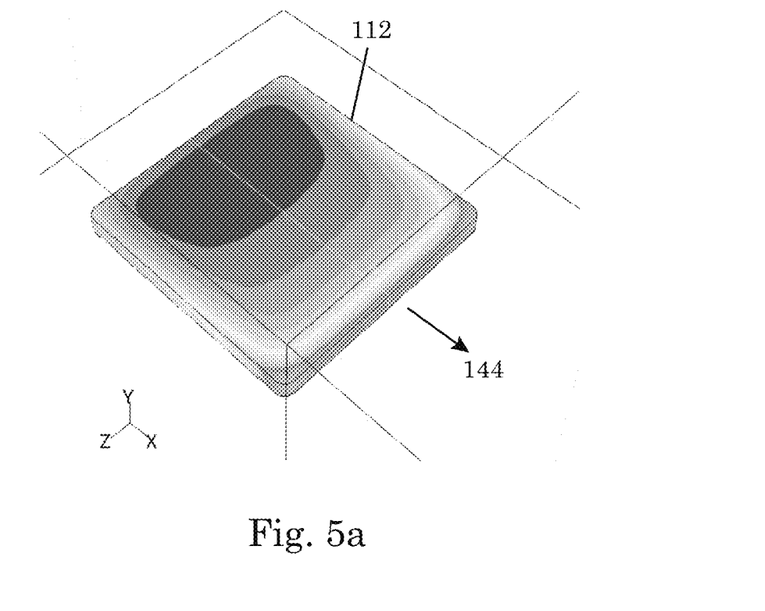
FIG. 5a is a plot of mold temperature without a radiation shield.
Figure 5B:
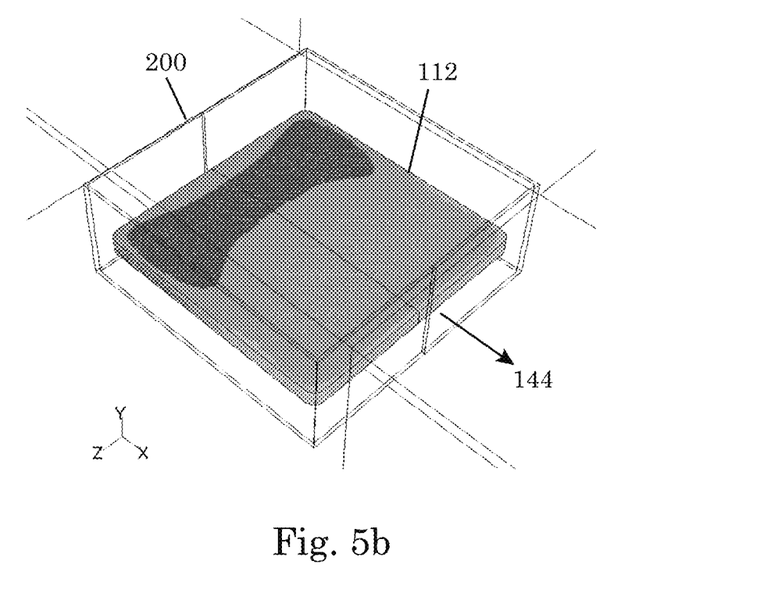
FIG. 5b is a plot of mold temperature with a radiation shield.

FIG. 5*a* shows a contour plot of the mold temperature in the second cooling station 140 if the mold 112 is cooled for a time period of 1 minute without the radiation shield 200 surrounding the mold 112. FIG. 5*b* shows a contour plot of the mold temperature in the second cooling station 140 if the mold 112 is cooled for the same time period with the radiation shield 200 surrounding the mold 112. The plots show that the temperature of the mold when cooled with a radiation shield is much more uniform than when not cooled with a radiation shield. The maximum temperature differential across the top surface of the mold in the plot of FIG. 4 is less than 2° C.

Example 2

Another study was carried out to determine the effect of the radiation shield parameters $h_t$, $h_b$, and d on mold temperature uniformity, where $h_t$ is the height of the radiation shield wall above the top end of the mold, $h_b$ is the height of the radiation shield wall below the bottom end of the mold, and d is the width of the smallest air gap between the radiation shield and the outer circumferential edge of the mold. For the study, the model of FIG. 4 and the temperature conditions mentioned above in connection with FIG. 4 were used. The modeling was performed using FLUENT® software.

Figure 6:
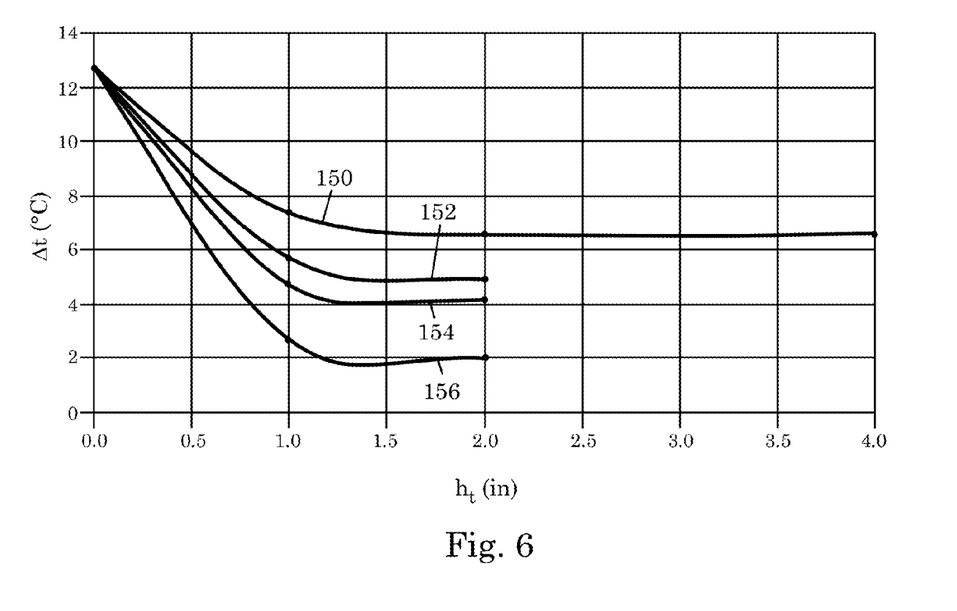
FIG. 6 is a plot of mold surface temperature differential as a function of radiation shield wall height.

FIG. 6 shows a plot of the temperature differential on the top surface of the mold as a function of radiation shield height $h_r$. The temperature differential ($\Delta t$) indicated in FIG. 6 is the difference between the maximum and minimum temperatures observed on the top surface of the mold. Lines 150-156 are shown in the plot, with line 150 corresponding to $h_b$=0, d=0.5 inches, and $\epsilon$=0.8, line 152 corresponding to $h_b$=1 inch, d=0.5 inches, and $\epsilon$=0.8, line 154 corresponding to $h_b$=1 inch, d=0.25 inches, and $\epsilon$=0.8, and line 156 corresponding to $h_b$=1 inch, d=0.25 inches, and $\epsilon$=0.4 (where c is the radiation shield wall emissivity).

From the plot of FIG. 6, it can be concluded that significant improvement in mold temperature uniformity is achieved by increasing the radiation shield height until the radiation shield wall extends 1.5 inches above the top surface of the mold, i.e., $h_r$=1.5 inches. Extending the radiation shield beyond 1.5 inches above the top end of the mold does not seem to provide any additional benefit to the mold temperature uniformity. From the plot of FIG. 6, it can also be concluded that further improvement to the mold temperature is realized by extending the radiation shield box below the mold (i.e., increasing $h_b$) and by positioning the radiation shield box as close as possible to the mold (i.e., reducing d). A further discovery was made that the mold temperature differential can be reduced below 2° C. by making the radiation shield wall reflective or with low emissivity of 0.4 or less.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of making glass articles, comprising:
    forming a glass sheet on a mold into a glass article having a three-dimensional shape;
    arranging the mold, with the glass article thereon, within an interior space of a radiation shield such that the radiation shield surrounds at least an entire perimeter of the mold and the mold is located between a leading end barrier and a trailing end barrier of the radiation shield; and
    translating the mold, glass article, and radiation shield through a sequence of cooling stations while maintaining the mold between the leading and trailing end barriers, wherein the leading and trailing end barriers inhibit radiation heat transfer at leading and trailing ends of the mold.

2. The method of claim 1, wherein the arranging is such that the radiation shield extends by a height greater than zero above a top surface of the mold.

3. The method of claim 1, wherein the arranging is such that the radiation shield extends by a height greater than zero below a bottom surface of the mold.

4. The method of claim 1, wherein the arranging is such that there is an air gap between an outer circumferential edge of the mold and an inner surface of the radiation shield facing the interior space.

5. The method of claim 1, wherein the forming comprises using vacuum to pull the glass sheet against a surface of the mold having a three-dimensional surface profile that defines the three-dimensional shape of the glass article.

6. The method of claim 1, further comprising maintaining temperatures in the cooling stations during the translation such that by the time the glass article reaches an end of the last cooling station in the sequence of cooling stations, the temperature of the glass article would have dropped to a temperature at which the viscosity of the glass article is greater than $10^{13}$ poise.

7. The method of claim 1, wherein the leading and trailing end barriers inhibit heat transfer such that a maximum temperature differential across a surface of the mold adjacent to the glass article is less than 5° C.

8. The method of claim 1, wherein the leading and trailing end barriers inhibit radiation heat transfer such that a maximum temperature differential across a surface of the mold adjacent to the glass article is less than 2° C.

9. The method of claim 1, wherein at least a portion of the radiation shield forming the leading and trailing and end barriers is coated with a material having an emissivity in a range from 0.1 to 0.4.

10. The method of claim 1, wherein the radiation shield is made of a material resistant to oxidation in a temperature range of 500° C. to 900° C.

11. The method of claim 1, wherein a reflective material is applied on at least a portion of the radiation shield forming the leading and trailing end barriers.

12. The method of claim 1, wherein at least a portion of the radiation shield includes a cooling plate.

13. The method of claim 1, wherein at least a portion of the radiation shield includes an isothermal heat transfer device.

14. The method of claim 1, wherein the radiation shield has a structure selected from a box, a tube, and a dome.

* * * * *